(12) United States Patent
Silverman et al.

(10) Patent No.: US 9,325,410 B1
(45) Date of Patent: Apr. 26, 2016

(54) DOWNLINK BEAMFORMING WITH INDIVIDUAL SPATIAL STREAM UPDATING

(75) Inventors: Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 454 days.

(21) Appl. No.: 13/445,765

(22) Filed: Apr. 12, 2012

(51) Int. Cl.
*H04B 7/00* (2006.01)
*H04B 17/00* (2015.01)
*H04B 7/24* (2006.01)

(52) U.S. Cl.
CPC .................................... *H04B 7/24* (2013.01)

(58) Field of Classification Search
USPC ................. 455/501, 509, 456.3, 62, 70, 41.2, 455/67.11
See application file for complete search history.

(56) References Cited

U.S. PATENT DOCUMENTS

| | | | |
|---|---|---|---|
| 6,006,110 A | 12/1999 | Raleigh et al. | |
| 7,301,924 B1 | 11/2007 | Gurbuz et al. | |
| 7,352,688 B1 | 4/2008 | Perahia et al. | |
| 7,352,718 B1 | 4/2008 | Perahia et al. | |
| 7,778,211 B2 | 8/2010 | Hedayat et al. | |
| 2010/0104038 A1* | 4/2010 | Stager et al. | 375/267 |
| 2010/0157861 A1 | 6/2010 | Na et al. | |
| 2010/0321237 A1 | 12/2010 | Na et al. | |
| 2011/0009071 A1 | 1/2011 | Stager et al. | |
| 2011/0019759 A1* | 1/2011 | Stager et al. | 375/267 |
| 2011/0026630 A1 | 2/2011 | Stager et al. | |
| 2011/0170521 A1 | 7/2011 | Wang et al. | |
| 2011/0170630 A1 | 7/2011 | Silverman et al. | |
| 2012/0014415 A1* | 1/2012 | Su et al. | 375/140 |
| 2013/0128935 A1* | 5/2013 | Janani et al. | 375/222 |

* cited by examiner

*Primary Examiner* — Ping Hsieh
*Assistant Examiner* — Xin Jia
(74) *Attorney, Agent, or Firm* — Cindy Kaplan

(57) ABSTRACT

In one embodiment, a method includes allocating at a wireless network device configured for multiple spatial stream beamforming, memory for spatial stream steering vectors, wherein individual memory space is provided for each spatial stream, receiving an N spatial stream uplink packet, computing a channel estimate based on the uplink packet and generating one or more of the spatial stream steering vectors using the channel estimate, individually updating 1 through N spatial stream steering vectors, and applying the spatial stream steering vectors to signals transmitted at the wireless network device. An apparatus and logic are also disclosed.

20 Claims, 3 Drawing Sheets

DOWNLINK BEAMFORMING WITH INDIVIDUAL SPATIAL STREAM UPDATING

TECHNICAL FIELD

The present disclosure relates generally to communication systems, and more particularly, to wireless communication systems.

BACKGROUND

Multiple-input multiple-output (MIMO) is a wireless technology that uses multiple transmitters and receivers to enhance performance. In a MIMO wireless communication system, a first device (e.g., access point) having a plurality of antennas sends multiple spatial stream transmissions to a second device (e.g., client, station) having a plurality of antennas. Beamforming is used to coordinate the signal sent from each antenna so that the signal at the receiver is improved. Beamforming can improve reception quality and increase data throughput in a MIMO communication system.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
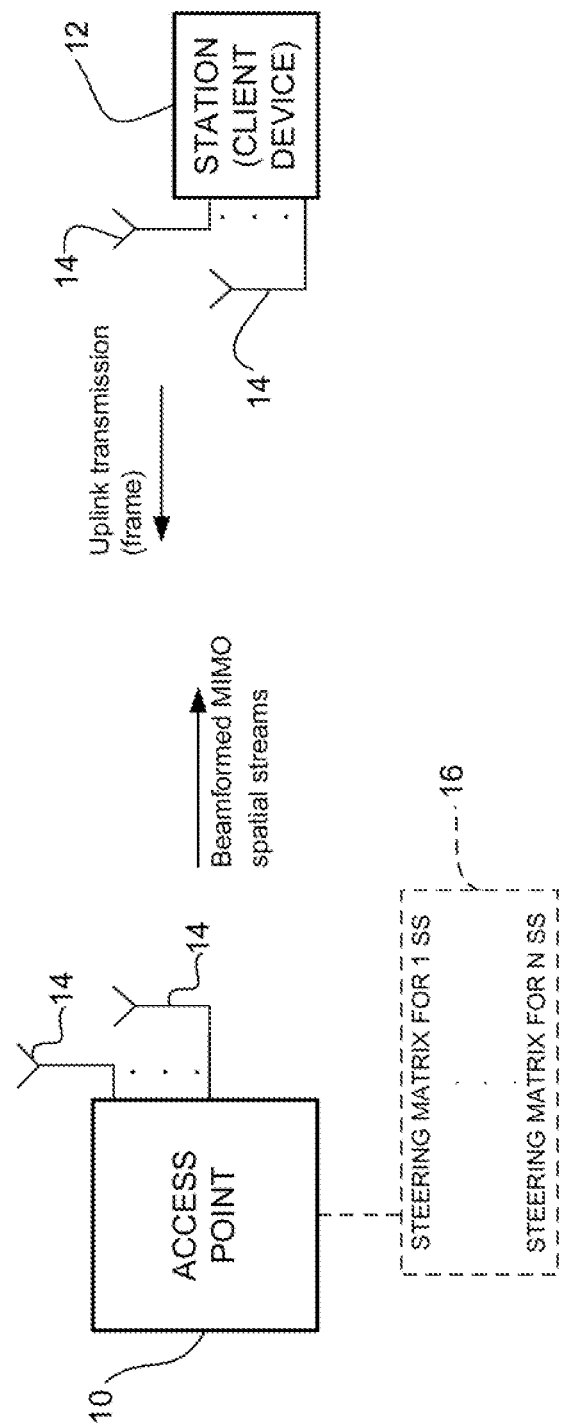
FIG. 1 illustrates an example of a network in which embodiments described herein may be implemented.

In one embodiment, a method generally comprises allocating at a wireless network device configured for multiple spatial stream beamforming, memory for spatial stream steering vectors, wherein individual memory space is provided for each spatial stream, receiving an N spatial stream uplink packet, computing a channel estimate based on the uplink packet and generating one or more of the spatial stream steering vectors using the channel estimate, individually updating 1 through N spatial stream steering vectors, and applying the spatial stream steering vectors to signals transmitted at the wireless network device.

In another embodiment, an apparatus generally comprises a plurality of antennas, memory for storing spatial stream steering vectors, wherein individual memory space is provided for each spatial stream, and a processor for computing a channel estimate based on an N spatial stream uplink packet received at the apparatus, generating one or more of said spatial stream steering vectors using said channel estimate, individually updating 1 through N spatial stream steering vectors, and applying the spatial stream steering vectors to signals transmitted at the apparatus.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a wireless communication system, a transmitter may utilize multiple transmit antennas for transmission to a receiver comprising multiple receive antennas. The multiple transmit and receive antennas form a multiple-input multiple-output (MIMO) channel that may be used to increase throughput or improve reliability. MIMO wireless communication techniques can enhance radio link reliability and increase system capacity through diversity gain and multiple signal stream transmission. Beamforming MIMO communication techniques can further improve throughput and reliability.

In order to perform beamforming, the transmitter obtains a channel estimate for the MIMO channel, derives steering matrices based on the channel estimate, and performs transmit spatial processing using the steering matrices. IEEE 802.11n defines several methods for MIMO beamforming. One method, referred to as explicit beamforming, requires the downstream channel to be measured at the receiver (beamformee) and relayed back to the transmitter (beamformer). The beamformer uses the measured channel information to derive the transmit beamforming parameters. Another technique defined in the standard is implicit beamforming. In this implementation, the upstream wireless channel is measured by the beamformer and the measurement is used to derive the parameters for subsequent downstream beamformed transmissions. Implicit beamforming has the advantage that the beamformee does not need to measure and send the channel state information to the beamformer. However, IEEE 802.11n implicit beamforming requires a calibration exchange between the beamformer and beamformee, which can complicate the transceiver design.

In the embodiments described herein, non-standard implicit beamforming is used, which does not require the receiver to be aware of beamforming occurring at the beamformer. The beamformee does not need to provide any feedback to help improve directivity. Assuming the channel is reciprocal (i.e., same in uplink and downlink directions), the beamformer estimates the channel at its end based on received signals. The beamformer uses these estimates to generate the steering matrices/vectors used to steer the outgoing signals.

One issue that arises with multiple spatial stream beamforming is that there is a lot of uplink traffic of varying spatial dimensions. If the steering vectors are not individually stored for each spatial stream, an update based on an uplink packet that does not fully sound the channel will invalidate at least a portion of the spatial stream steering vectors. For example, if a 1 spatial stream (1 SS) uplink packet is received and causes an update to a steering matrix used for all spatial stream transmissions, the 2 spatial stream and 3 spatial stream steering vectors will be overwritten by the 1 spatial stream update. If the system is configured to turn off N spatial stream updating or filter out N spatial stream uplink packets, where N<threshold, then lower spatial stream beamforming will be turned off (e.g., 2 and 1 spatial stream beamforming turned off for 3 spatial stream clients, 1 spatial stream beamforming turned off for 2 spatial stream clients, etc.). Another option is to have a baseband register that completely stops/restarts all updating for a client. However, there is no way to ensure that it has stopped after a full channel sounding or after 1 spatial stream sounding. It will most likely be stopped right after the fully sounded steering matrix is overwritten by an update resulting from a 1 spatial stream uplink packet.

The embodiments described herein allow for individual updating of the different spatial stream steering vectors based on the uplink spatial sounding dimension (number of sounded dimension of channel, number of spatial streams) in non-standard implicit beamforming implementations. As described in detail below, memory space is provided individually for 1, 2, ... N spatial stream steering vectors and the memory spaces may be updated in groups or individually based on the uplink packet spatial sounding dimension. This is very important for multiple spatial stream non-standard implicit beamforming, where there are frequent uplink packets that do not fully sound the channel. Without the embodiments described herein, the 1 spatial stream steering vector will remain valid throughout all updates, while the multiple spatial stream steering vectors will be frequently invalidated (overwritten) by the 1 spatial stream implicit sounding updates.

Referring now to the drawings, and first to FIG. 1, an example of a network in which embodiments described herein may be implemented is shown. FIG. 1 illustrates a MIMO wireless communication system comprising a multiple spatial stream capable access point (AP) 10 and station (client device) 12. For simplification, only one station 12 is shown, however, the access point 10 may be in communication with any number of stations 12. The access point 10 and station 12 may communicate using a wireless communication protocol such as IEEE 802.11n, for example. Each AP 10 and station 12 comprises a plurality of antennas 14 for use in wireless communication. The AP 10 may also be in communication with a wired network (not shown). The AP 10 is configured to simultaneously transmit from its antennas 14 multiple signal streams, also referred to as spatial streams, to the station 12. The station 12 may also be configured to simultaneously transmit multiple spatial streams to the AP.

In the example described herein, transmissions from the AP 10 to the station 12 are referred to as downlink transmissions and transmissions from the station to the AP are referred to as uplink transmissions. Also, the AP 10 is referred to as a beamformer and the station 12 is referred to as a beamformee.

The access point 10 is configured to beamform multiple spatial streams on the downlink to the station 12 using beamforming MIMO techniques. The station 12 may transmit multiple spatial streams to the AP 10 or may operate in a single or reduced spatial stream uplink mode. Beamforming uses information about the channel between the AP 10 and station 12. The beamforming information is derived from channel estimates based on uplink transmissions from the station 12 and used to optimally transmit packets by applying phase and amplitude differences between transmit paths. The phase and amplitude changes may be applied on a per-subcarrier basis. The downlink phase of each subcarrier on each transmit antenna may be adjusted based on uplink channel estimates.

As previously described, the access point 10 is configured for non-standard (e.g., not defined in IEEE 802.11n) beamforming. The AP 10 is configured to estimate the uplink channel from received spatial stream uplink transmissions (frames, packets) from the station 12, wherein the transmission does not contain explicit sounding signals (as used in explicit beamforming). The AP 10 uses uplink frames sent from the station 12 to estimate the channel and determine beamforming vectors without client support or knowledge of the beamforming. Thus, no airtime overhead is needed for sounding and client participation is not required.

A channel estimate may be obtained on any uplink frame (e.g., data packet, ACK, control packet). The AP 10 estimates the phase and amplitude of the channel applied to the uplink frame. Many techniques are known for computing the channel estimate. Wireless communication protocols, such as IEEE 802.11n set forth techniques for use in computing a channel estimate from a received transmission. For example, the IEEE 802.11n preamble provides information for sounding the channel dimension up to the number (N) of spatial streams. The channel estimate is used to generate the steering matrix, which is used to beam MIMO spatial streams to the station 12.

As described in detail below, the access point 10 provides memory space individually for 1, 2, 3, ... N spatial stream steering matrices/vectors as indicated at 16 in FIG. 1. The memory spaces are updated individually (e.g., for each steering vector or group of steering vectors) based on the uplink packet sounding.

It is to be understood that the network shown in FIG. 1 is only an example and that the embodiments described herein may be implemented in networks having different network devices or network topologies. For example, as previously noted, the access point 10 may be in communication with any number of stations 12. Also, the beamforming process described herein may be implemented at one or more of the stations for transmittal of data to another station or access point.

Figure 2:
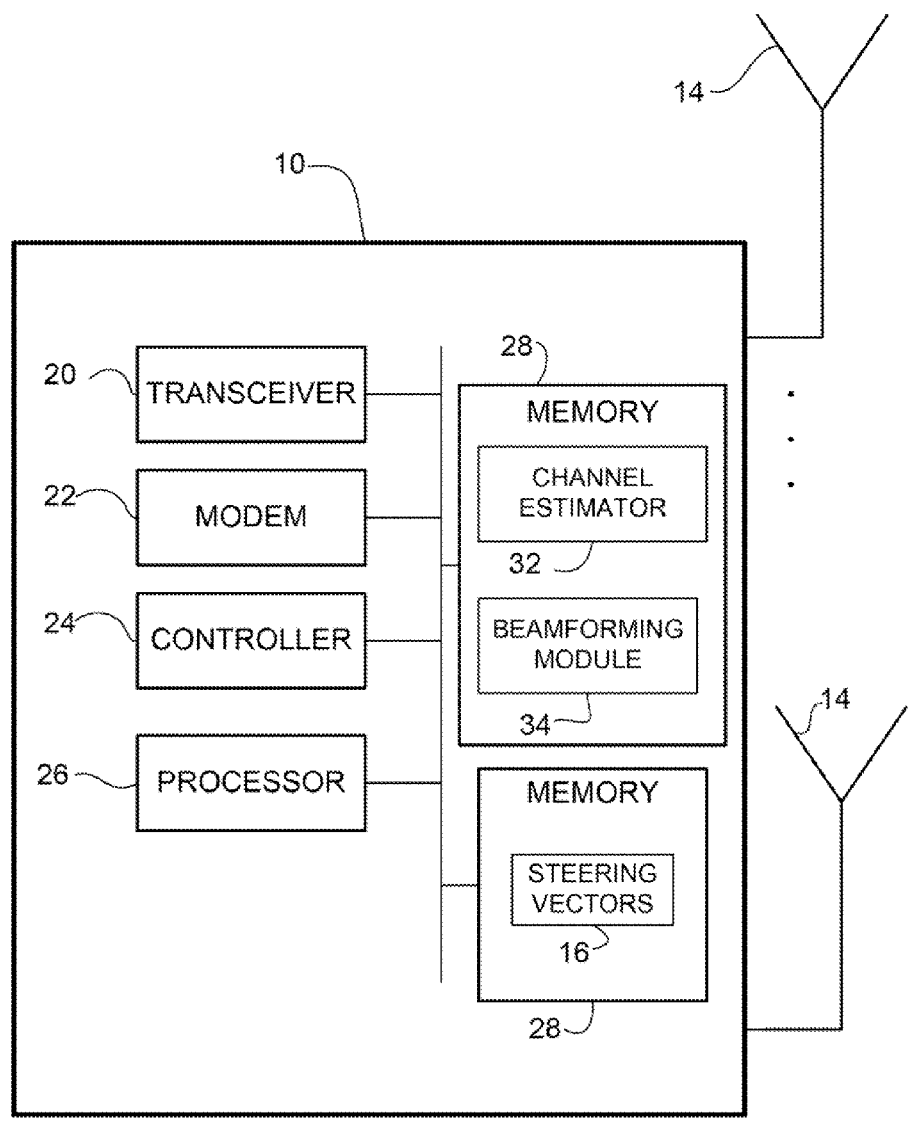
FIG. 2 depicts an example of a network device useful in implementing embodiments described herein.

FIG. 2 is a block diagram illustrating an example of a wireless network device (e.g., access point 10) that may be used to implement embodiments described herein. In one embodiment, the network device 10 is a programmable machine that may be implemented in hardware, software, or any combination thereof. The wireless network device 10 includes a transceiver 20, modem 22, controller 24, processor 26, memory 28, channel estimator 32, and beamforming module 34.

The transceiver 20 comprises a plurality of radio frequency (RF) receivers, one for each antenna 14. The modem 22 receives as input, the output of the RF receivers. Analog-to-digital converters (ADCs) may reside between the outputs of the RF receivers and the modem, within the modem, or within the RF receivers. For simplification, the ADCs are not shown in FIG. 2.

The modem 22 demodulates signals from the receivers and modulates transmit signals for transmission. The output of the modem 22 is coupled to RF transmitters at the transceiver 20. The transmitters are coupled to the antennas 14. Digital to analog converters (DACs) may be provided between the digital output of the modulator and the analog input to the transmitters. For simplification, the DACs are not shown.

The modem 22 is configured to implement modulation and framing of signals according to the applicable communication protocol or standard (e.g., IEEE 802.11) under control of the controller 24. The controller 24 includes logic to implement embodiments described herein from the perspective of the AP 10. The logic may be encoded in one or more tangible media (memory 28) for execution by the processor 26. For example, the processor 26 may execute codes stored in a computer-readable medium such as memory 28. The logic may be in the form of software executed by the processor 26, digital signal processor instructions, or in the form of fixed logic in an integrated circuit, for example.

Memory 28 may be a volatile memory or non-volatile storage, which stores various applications, operating systems, modules, and data for execution and use by the processor 26. Memory 28 may include multiple memory components (e.g., storage for software code, storage for steering vectors/matrices 16), as shown in FIG. 2.

The channel estimator 32 and beamformer 34 may be code, modules, applications, or instructions stored in memory 28. The channel estimator 32 uses information derived from signals received at the antennas 14 for a received transmission to compute a channel estimate. As previously described, the channel estimator 32 generates a channel estimate using implicit channel sounding (i.e., uplink packets do not include explicit channel information). The beamformer 34 uses the channel estimate information computed by the channel estimator 32 to generate and apply beamforming weight vectors (steering vectors) to transmit signals to be transmitted via the transmitters of the radio transceiver 20.

As described below, one or more components shown in the block diagram of FIG. 2 may be implemented on a chip or chipset.

It is to be understood that the network device 10 shown in FIG. 2 and described above is only an example and that different configurations of network devices may be used. For example, the network device 10 may further include any suitable combination of hardware, software, algorithms, processors, devices, components, or elements operable to facilitate the capabilities described herein.

As described above, a separate beamforming matrix is stored for each spatial stream (e.g., one for 3 spatial stream transmissions, one for 2 spatial stream transmissions, and one for 1 spatial stream transmissions). The matrix is defined for nTx (number of transmitting antennas/transmission chains), number of spatial streams (N), and number of subcarriers (numSubC). Matrices are stored individually for each spatial stream so that the steering vectors can be updated individually for each spatial stream.

In one example, the access point 10 is configured to support 1, 2, and 3 spatial streams and memory space is allocated (defined, provided) for the following:
  (1) nTx by 3 by numSubC
  (2) nTx by 2 by numSubC
  (3) nTx by 1 by numSubC
Each matrix includes a steering vector for each subcarrier k (k=1:numSubC), for each nTx. A 3 SS (spatial stream) transmission uses the matrix at (1), a 2 SS transmission uses the matrix at (2), and a 1 SS transmission uses the matrix at (3).

Default values may be stored for the spatial stream steering vectors until a steering vector can be generated based on a received uplink transmission.

Upon receiving a 1 spatial stream uplink packet at the access point 10, the AP only updates the 1 spatial stream steering vector, without making any changes to the steering vectors for 2 spatial streams or 3 spatial streams. When the AP 10 receives a 2 spatial stream uplink packet, the AP updates the 1 spatial stream and 2 spatial stream steering vectors. The 1 spatial stream, 2 spatial stream, and 3 spatial stream steering vectors are each individually updated, as required, upon receipt of a 3 spatial stream uplink packet at the AP 10.

The steering vectors for each spatial stream are stored for each client 12 associated with the AP. For example, memory space may be divided into separate regions for each client. Within each client memory region, there is steering information for each of the possible subcarriers, for each Tx, and for each spatial stream.

The spatial stream steering vectors may be stored in any type of data structure, including for example, one or more tables. The client may be identified in the table, for example, by its MAC address. The steering matrices may be stored, for example, in cache memory, and indexed in a beamforming table containing the addresses of the clients. The table is preferably configured so that updates will not affect any frame currently being transmitted.

In one embodiment, the spatial stream steering vectors are calculated in software and stored in hardware (e.g., chip, chipset). As previously described, the memory stores separate vectors/matrices used for each spatial stream (SS) transmission. Hardware may pass a transmission vector containing channel state information to software for processing beamforming vectors, which are then passed back to the hardware for storage. In one example, data received from the receivers and processed at the AP 10 (e.g., FFT (Fast Fourier Transform) data) along with other MAC and physical data is written to memory, processed by software to create a steering matrix, and transferred back to hardware for storage. Software is used to calculate the steering matrix, which will include phase and gain adjustments, and programs the table with appropriate information.

Figure 3:
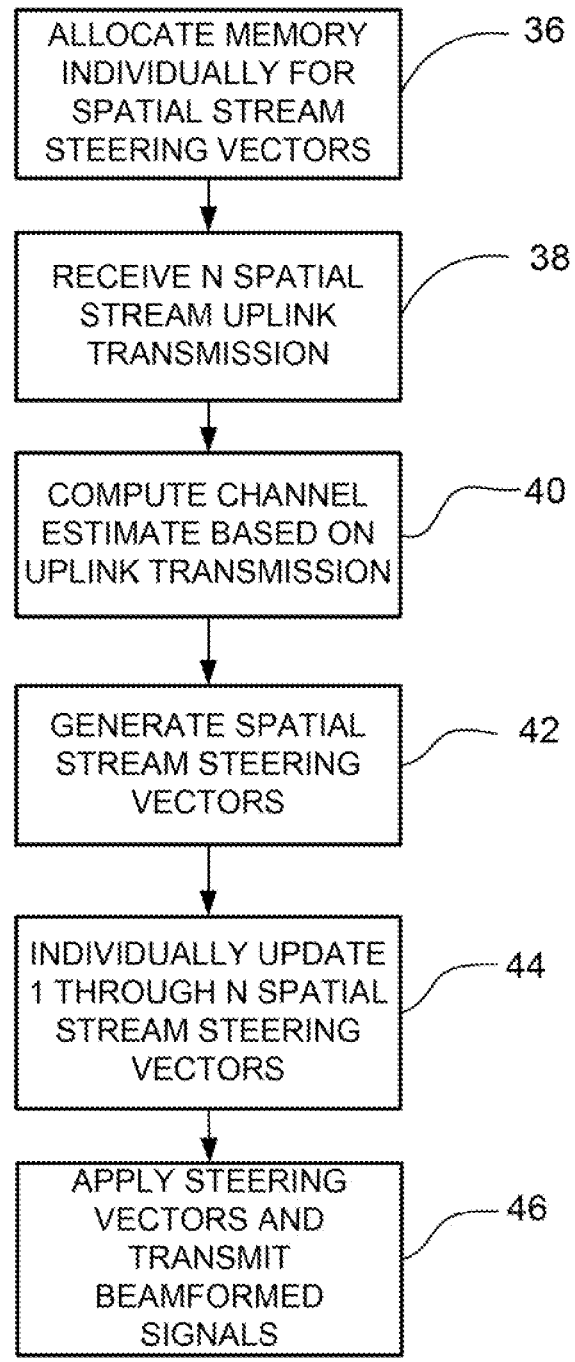
FIG. 3 is a flowchart illustrating an overview of a process for downlink beamforming with individual spatial stream updating, in accordance with one embodiment.

FIG. 3 is a flowchart illustrating a process for downlink beamforming with individual spatial stream updating, in accordance with one embodiment. At step 36, memory is allocated for a plurality of spatial stream steering vectors at a wireless network device (e.g., access point 10). As described above, memory space is provided individually for each spatial stream transmitted at the wireless network device (e.g., 1, 2, 3, . . . N) so that the steering vectors can be individually updated based on the uplink packet sounding. The AP 10 receives a transmission (uplink packet) associated with N spatial streams via a plurality of antennas at station 12 (step 38). The access point 10 computes a channel estimate based on the uplink packet (step 40) and generates one or more spatial stream steering vectors using the channel estimate (step 42). The AP 10 individually updates 1 through N spatial stream steering vectors, as required (step 44). For example, if the uplink packet is a 1 spatial stream uplink packet, the AP only updates the 1 spatial stream steering vector. If the uplink packet is a 2 spatial stream uplink packet, the AP only updates the 1 and 2 spatial stream steering vectors. If the uplink packet is a 3 spatial stream uplink packet, the AP updates the 1, 2, and 3 spatial stream steering vectors. The corresponding steering vectors are applied to the downlink transmissions and the beamformed signals are transmitted from the AP 10 to the station 12 (step 46).

It is to be understood that the process shown in FIG. 3 and described above is only an example and that steps may be added, combined, or modified, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:
1. A method comprising:
  allocating at a wireless network device configured for multiple spatial stream beamforming, memory for spatial stream steering vectors, wherein memory space is provided individually for each spatial stream transmitted at the wireless network device in a channel;
  receiving an N spatial stream uplink packet at the wireless network device, wherein the uplink packet does not fully sound said channel;
  storing 1 through N spatial streams individually in said memory space for said 1 through N spatial streams so that said spatial stream steering vectors can be individually updated based on an uplink packet sounding;

computing a channel estimate based on said uplink packet and generating one or more of said spatial stream steering vectors using said channel estimate;

individually updating said 1 through N spatial stream steering vectors based on the number of spatial streams in said uplink packet; and applying said spatial stream steering vectors to signals transmitted at the wireless network device;

wherein only said 1 through N spatial stream steering vectors are updated in response to receiving the N spatial stream uplink packet, without updating remaining of said spatial stream steering vectors.

2. The method of claim 1 wherein allocating memory comprises allocating memory space for a matrix for each of said spatial streams.

3. The method of claim 2 wherein said matrix comprises spatial stream steering vectors for 1 through n transmitting antennas at the wireless network device.

4. The method of claim 2 wherein said matrix comprises spatial stream steering vectors for a plurality of subcarriers.

5. The method of claim 1 wherein the wireless network device is operable to transmit three spatial streams, and receiving an N spatial stream uplink packet comprises receiving a one, two, or three spatial stream uplink packet.

6. The method of claim 1 wherein said memory comprises a beamforming table stored on a chipset at the wireless network device.

7. The method of claim 1 wherein allocating memory comprises allocating memory for each client associated with the wireless network device.

8. The method of claim 1 wherein calculating one or more of said spatial stream vectors comprises receiving said channel estimate stored in hardware and calculating said one or more spatial stream vectors using software.

9. An apparatus comprising:

a plurality of antennas for use in multiple spatial stream beamforming;

memory for storing spatial stream steering vectors, wherein memory space is provided individually for each spatial stream transmitted in a channel at the wireless network device; and a processor for storing 1 through N spatial streams individually in said memory so that said spatial stream steering vectors can be individually updated based on an uplink packet sounding, computing a channel estimate based on an N spatial stream uplink packet received at the apparatus, generating one or more of said spatial stream steering vectors using said channel estimate, individually updating said 1 through N spatial stream steering vectors, and applying said spatial stream steering vectors to signals transmitted at the apparatus;

wherein the apparatus is configured for non-standard (not defined in IEEE 802.11n) beamforming and wherein only said 1 through N spatial stream steering vectors are updated in response to receiving the N spatial stream uplink packet, without updating remaining of said spatial stream steering vectors.

10. The apparatus of claim 9 wherein memory space is provided for a matrix for each of said spatial streams.

11. The apparatus of claim 10 wherein said matrix comprises spatial stream steering vectors for each of the antennas.

12. The apparatus of claim 10 wherein said matrix comprises spatial stream steering vectors for a plurality of subcarriers.

13. The apparatus of claim 9 wherein the apparatus is operable to transmit three spatial streams, and said N spatial stream uplink packet comprises a one, two, or three spatial stream uplink packet.

14. The apparatus of claim 9 wherein said memory comprises a beamforming table stored on a chipset at the apparatus.

15. The apparatus of claim 9 wherein memory is allocated for each client associated with the apparatus.

16. The apparatus of claim 9 wherein calculating one or more of said spatial stream vectors comprises receiving said channel estimate stored in hardware and calculating said one or more spatial stream vectors using software.

17. Logic encoded on one or more tangible computer readable media for execution and when executed operable to:

allocate at a wireless network device configured for multiple spatial stream beamforming, memory for spatial stream steering vectors, wherein memory space is provided individually for each spatial stream transmitted in a channel at the wireless network device;

store 1 through N spatial streams individually in said memory space for said 1 through N spatial streams so that said spatial stream steering vectors can be individually updated based on an uplink packet sounding;

compute a channel estimate based on an N spatial stream uplink packet received at the wireless network device and generate one or more of said spatial stream steering vectors using said channel estimate, wherein the uplink packet does not fully sound a channel;

individually update 1 through N spatial stream steering vectors based on the number of spatial streams in said uplink packet; and apply said spatial stream steering vectors to signals transmitted at the wireless network device;

wherein only said 1 through N spatial stream steering vectors are updated in response to receiving the N spatial stream uplink packet, without updating remaining of said spatial stream steering vectors.

18. The logic of claim 17 wherein the wireless network device is operable to transmit three spatial streams, and said N spatial stream uplink packet comprises a one, two, or three spatial stream uplink packet.

19. The logic of claim 17 wherein said memory comprises a beamforming table stored on a chipset at the wireless network device.

20. The logic of claim 17 wherein allocating memory comprises allocating memory space for a matrix for each of said spatial streams.

\* \* \* \* \*